United States Patent
Esmailzadeh et al.

[11] Patent Number: 6,163,533
[45] Date of Patent: *Dec. 19, 2000

[54] RANDOM ACCESS IN A MOBILE TELECOMMUNICATIONS SYSTEM

[75] Inventors: Riaz Esmailzadeh, Kawasaki, Japan; Maria Gustafsson, Stockholm, Sweden

[73] Assignee: Telefonaktiebolaget LM Ericsson (publ)

[*] Notice: This patent issued on a continued prosecution application filed under 37 CFR 1.53(d), and is subject to the twenty year patent term provisions of 35 U.S.C. 154(a)(2).

[21] Appl. No.: 08/847,655

[22] Filed: Apr. 30, 1997

[51] Int. Cl.$^7$ .................................................. H04B 7/216
[52] U.S. Cl. ........................................ 370/342; 370/515
[58] Field of Search .................................. 370/208, 320, 370/331, 335, 342, 322, 206, 209, 515, 436; 375/200, 203, 206, 309

[56] References Cited

U.S. PATENT DOCUMENTS

| | | | |
|---|---|---|---|
| 5,621,752 | 4/1997 | Antonio et al. | 375/200 |
| 5,673,260 | 9/1997 | Umeda et al. | 370/342 |

FOREIGN PATENT DOCUMENTS

| | | |
|---|---|---|
| WO 94/26074 | 11/1994 | WIPO . |
| WO 95/22210 | 8/1995 | WIPO . |
| WO 96/13952 | 5/1996 | WIPO . |
| WO 97/11571 | 3/1997 | WIPO . |

OTHER PUBLICATIONS

EPO Search Report; File No. RS 99454US; Search Completed Oct. 20, 1997.

*Primary Examiner*—Michael O'Neill
*Assistant Examiner*—Kim T. Nguyen
*Attorney, Agent, or Firm*—Jenkens & Gilchrist, P.C.

[57] ABSTRACT

A method, system, and apparatus assigns each sector in a cell a unique preamble spreading code and a unique long-code which is concatenated with a signature-associated short code to spread the data in the data field. The period selected for the long-code can be relatively long in duration (e.g., up to hours or days in length). The widths of the transmission time slots are set equal to the length of the preambles. Subsequent to the preamble period, the matched filter is still enabled to receive the preambles of other random access requests. Therefore, the matched filter can be utilized continuously and more efficiently. Additionally, the length of the data field is not restricted. The method of concatenated spreading of the data field portion of the random access packet allows a user to generate a packet which is as long as desired. Moreover, there is very little danger that the resulting packet will collide with other random access request packets.

17 Claims, 3 Drawing Sheets

RANDOM ACCESS IN A MOBILE TELECOMMUNICATIONS SYSTEM

RELATED APPLICATIONS

This application is related by subject matter to commonly-assigned U.S. patent application Ser. No. 08/733,501, which was filed Oct. 18, 1996.

BACKGROUND OF THE INVENTION

1. Technical Field of the Invention

The present invention relates generally to the field of mobile telecommunications and, in particular, to a method for processing multiple random access mobile-originated calls.

2. Description of Related Art

The next generation of mobile communications systems will be required to provide a broad selection of telecommunications services including digital voice, video and data in packet and channel circuit-switched modes. As a result, the number of calls being made is expected to increase significantly, which will result in much higher traffic density on random access channels (RACHs). Unfortunately, this higher traffic density will also result in increased collisions and access failures. Consequently, the new generation of mobile communications systems will have to use much faster and flexible random access procedures, in order to increase their access success rates and reduce their access request processing times.

In most mobile communications systems, such as, for example, the European joint development referred to as the "Code Division Testbed" (CODIT), and systems operating in accordance with the IS-95 Standard (ANSI J-STD-008), a mobile station can gain access to a base station by first determining that the RACH is available for use. Then, the mobile station transmits a series of access request preambles (e.g., single 1023 chip symbols) with increasing power levels, until the base station detects the access request. In response, the base station starts the process of controlling the mobile station's transmitted power via a downlink channel. Once the initial "handshaking" between the mobile station and base station has been completed, the mobile user transmits a random access message.

In a Spread Spectrum Slot Reservation Multiple Access (SS-SRMA) System, a slotted ALOHA (S-ALOHA) random access scheme is used. At the beginning of a slot, a mobile station will send a random access packet to the base station and then await an acknowledgment from the base station that the packet was received. This S-ALOHA scheme dispenses with a number of steps that characterize the CODIT and IS-95 random access schemes (namely, power ramping and power control).

More specifically, in a CODIT-based Code Division Multiple Access (CDMA) system, a mobile station will attempt to access the base station receiver by using a "power ramping" process that increases the power level of each successive transmitted preamble symbol. As soon as an access request preamble is detected, the base station activates a closed loop power control circuit, which functions to control the mobile station's transmitted power level in order to keep the received signal power from the mobile station at a desired level. The mobile station then transmits its specific access request data. The base station's receiver "despreads" the received (spread spectrum) signals using a matched filter, and diversity-combines the despread signals to take advantage of antenna diversity.

In an IS-95 CDMA system, a similar random access technique is used. However, the primary difference between the CODIT and IS-95 process is that the IS-95 mobile station transmits a complete random access packet instead of just the preamble. If the base station does not acknowledge the access request, the IS-95 mobile station re-transmits the access request packet at a higher power level. This process continues until the base station acknowledges the access request.

In a mobile communications system using an S-ALOHA random access scheme, such as the method disclosed in the above-described U.S. patent application Ser. No. 08/733,501 (hereinafter, "the '501 Application"), a mobile station generates and transmits a random access packet. A diagram that illustrates a frame structure for such a random access packet is shown in FIG. 1. The random access packet ("access request data frame") comprises a preamble and a data field portion. The preamble contains a unique signature (bit) pattern, which is "L" symbols long. The signature pattern is randomly selected from a set of patterns that are, but not necessarily, orthogonal to each other. As such, the use of this unique signature pattern feature, as described and claimed in the '501 Application, provides a significantly higher throughput efficiency than prior random access schemes.

As described in the '501 Application, the data field of the random access packet includes certain random access information, including mobile (user) identity information, required service number (number of services to be provided), required air time (time needed to complete a message), short packet data message (to increase transmission efficiency), and an error detection redundancy field (cyclic redundancy code). For reasons elaborated in the '501 Application, the spreading ratio (spread spectrum modulation) of the preamble is selected to be longer than the spreading ratio of the data field portion. However, situations may be envisioned in which this is not necessarily so.

The random access packet (e.g., such as the packet shown in FIG. 1) is transmitted by the mobile station at the beginning of the next available slot. A block diagram of an apparatus that can be used in a mobile station to generate and transmit the random access packet illustrated in FIG. 1 is shown in FIG. 2. Essentially, as illustrated by FIG. 2, the preamble and data field of the random access packet are generated and spread separately (with respective spreading codes) and then multiplexed and transmitted by the mobile station.

Next, the random access packet transmitted by the mobile station is received and demodulated at the target base station with a matched filter-based receiver. FIG. 3 is a block diagram of a detection section (for one antenna) of a base station's random access receiver, which functions primarily to estimate the timing of the received signal rays. The matched filter, which is used only during the preamble period, is tuned to the preamble's spreading code. The matched filter is used to detect the presence of the random access request, and despread the preamble part of the random access packet and feed it to the accumulator unit. The accumulator (signatures 1-l) is a unique feature used for the '501 Application's random access method to sum the signals at the output of the matched filter during the preamble's (M) symbol periods, in order to increase the received signal-to-interference (S/I) power ratio. Since each received preamble comprises a unique signature pattern, the accumulation operation is carried out with a plurality of accumulators (1-l), with each accumulator tuned to one of the possible signature patterns to be received.

FIG. 4 is a simple block diagram of an accumulator that can be used for the I channel (quadrature detection) in the random access detector section shown in FIG. 3. A similar accumulator can be used for the Q channel. Referring to FIGS. 3 and 4, the output of each accumulator (signature 1-l) is coupled to a peak detection unit. At the end of the preamble period, each peak detection unit searches the output of its respective matched filter for each signal peak that exceeds a predetermined detection threshold. Each peak detection unit then registers (detects and stores) the magnitude and relative phase of each of those peak signals, and thereby determines the number of significant signal rays available for demodulation in the receiver. As such, the timing of each peak is estimated and used to set the receiver's "Rake" parameters (Rake receiver sections 1-l). FIG. 5 is a block diagram of a random access demodulator that can be used to demodulate the data field portion of the random access packet. Essentially, the random access demodulator section decodes the data information in the received data field and checks for transmission errors.

Notably, although the random access apparatus and method described above with respect to FIGS. 1–5 has numerous advantages over prior random access schemes, a number of problems still exist that remain to be solved. For example, a large number of packet collisions may occur if mobile stations in all of the cells use the same spreading codes during the preamble or data field processing stage. As a consequence, an excessive number of the random access requests will have to be retransmitted, which can lead to system instability. Moreover, using the random access apparatus and method described above, since the random access requests are transmitted at the beginning of the next time slot, the base station's matched filter receiver is not utilized as efficiently as it can be, because the matched filter receiver is idle for the complete period subsequent to the preamble reception stage. Additionally, since the length of the random access packet used with the above-described scheme is fixed, the size of the short data packets is restricted by the extent of use of the remainder of the packet. For all of these reasons, a more flexible random access request procedure is needed to resolve these problems.

SUMMARY OF THE INVENTION

It is, therefore, an object of the present invention to utilize random access channels more efficiently.

It is another object of the present invention to be capable of receiving a significantly higher number of random access requests per matched filter than received by conventional means.

It is yet another object of the present invention to reduce the probability of collisions between random access requests and also minimize their loss.

It is still another object of the present invention to be capable of selecting the length of a data field in a random access request packet to allow increased flexibility in selecting the length of a short packet field.

It is yet another object of the present invention to provide a random access packet that can be used to quickly establish long data or voice calls.

It is still another object of the present invention to maintain a low level of cross-correlation between random access attempts made from neighboring sectors/cells.

In accordance with the present invention, the foregoing and other objects are achieved by a method that assigns each sector in a cell a unique preamble spreading code and a unique long-code which is concatenated with a short spreading code associated with a randomly selected signature, and is used to spread the data part of a random access packet. The period selected for the long-code can be relatively long in duration (e.g., up to hours or days in length). Also, the widths of the transmission time slots are set equal to the length of the preambles. Consequently, the mobile station's random access requests can be timed to start at the beginning of the slots, and detected during the preamble periods by the matched filter in the base station's random access receiver. The data field of the mobile station's random access request is transmitted in the slots following the preamble and received by the rake receiver at the base station. However, subsequent to the preamble period, the matched filter is still enabled to receive the preambles of other random access requests. Therefore, the matched filter can be utilized continuously and more efficiently, and a significantly larger number of random access requests can be processed in comparison with prior random access schemes. As such, the communications throughput and efficiency of a random access system using the present method are substantially higher than the throughput and efficiency of prior random access systems. Additionally, the length of the data field is not restricted. The method of concatenated spreading of the data field portion of the random access packet allows a user to generate a packet which is as long as desired. Moreover, the concatenated spreading removes the danger that the resulting packet will collide with other random access request packets, since the spreading pattern and/or its phase are unique.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

The preferred embodiment of the present invention and advantages are best understood by referring to FIGS. 1–8 of the drawings, like numerals being used for like and corresponding parts of the various drawings.

Essentially, in accordance with the present invention, the method assigns each sector in a cell a unique preamble spreading code, and also a unique long-code which is concatenated with the data field's (signature-associated) short spreading code. The period selected for the long-code can be relatively long in duration (e.g., up to hours or days in length). Consequently, it can be said that the data field of the random access packet is transmitted in a dedicated channel, because no two messages can have the same spreading sequence and phase unless they have chosen the same signature and transmitted their preambles at the same time. This results in a collision of the packets, and renders these random access attempts unsuccessful. However, the probability of this happening is very small. Notably, this method of assigning sector/cell-unique spreading codes and long-codes provides a significantly low probability of collision between multiple access random attempts in neighboring sectors or cells.

Also in accordance with the present invention, the method sets the widths of the transmission time slots equal to the length of the preamble (minus, for practical purposes, a predefined guard time). Consequently, the mobile station's random access request can be timed to start at the beginning of the slot, and detected during the preamble period by the matched filter in the base station's random access receiver. The data field of the mobile station's random access request is transmitted in the slots succeeding that of the preamble and received by the rake receiver at the base station. However, with the present method, subsequent to the preamble period, the matched filter is enabled to receive the preambles of other random access requests made by other mobile stations. Therefore, in accordance with the present invention, the matched filter can be utilized continuously and efficiently, and a significantly larger number of random access requests can be processed in comparison with prior random access schemes. As such, the communications throughput and efficiency of a random access system using the present method are significantly higher than the throughput and efficiency of prior random access systems.

Furthermore, in accordance with the present method, the length of the data field is not restricted. In other words, the method of concatenated spreading of the data field portion of the random access packet allows a user to generate a packet which is as long as desired. Moreover, in using this concatenated spreading approach, there is very little danger that the resulting packet will collide with other random access request packets.

Figure 1:
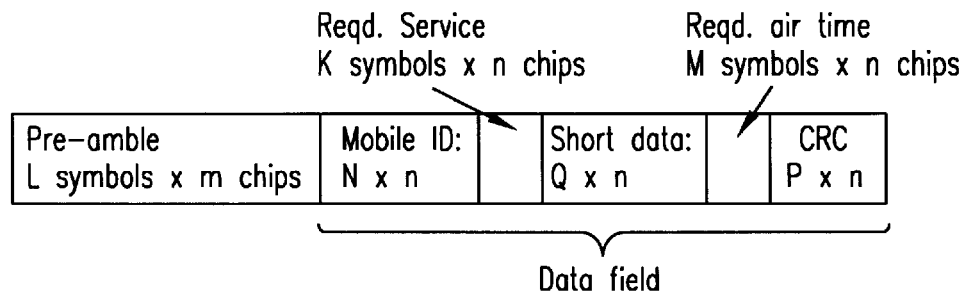
FIG. 1 is a diagram that illustrates a frame structure for a random access packet.
Figure 2:
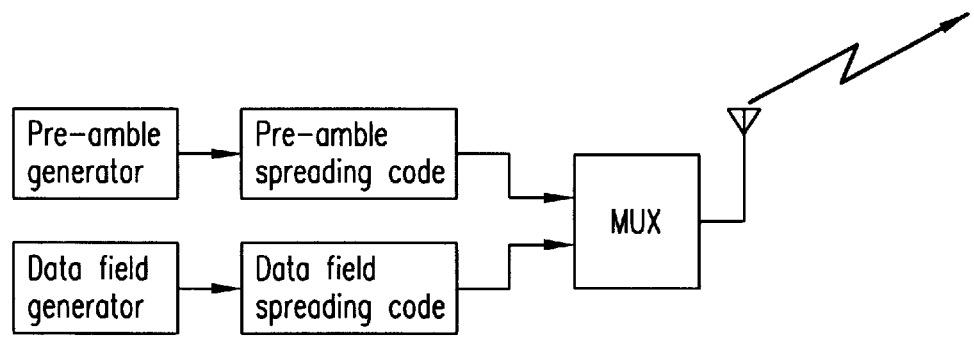
FIG. 2 is a block diagram of an apparatus that can be used in a mobile station to generate and transmit the random access packet illustrated in FIG. 1.
Figure 3:
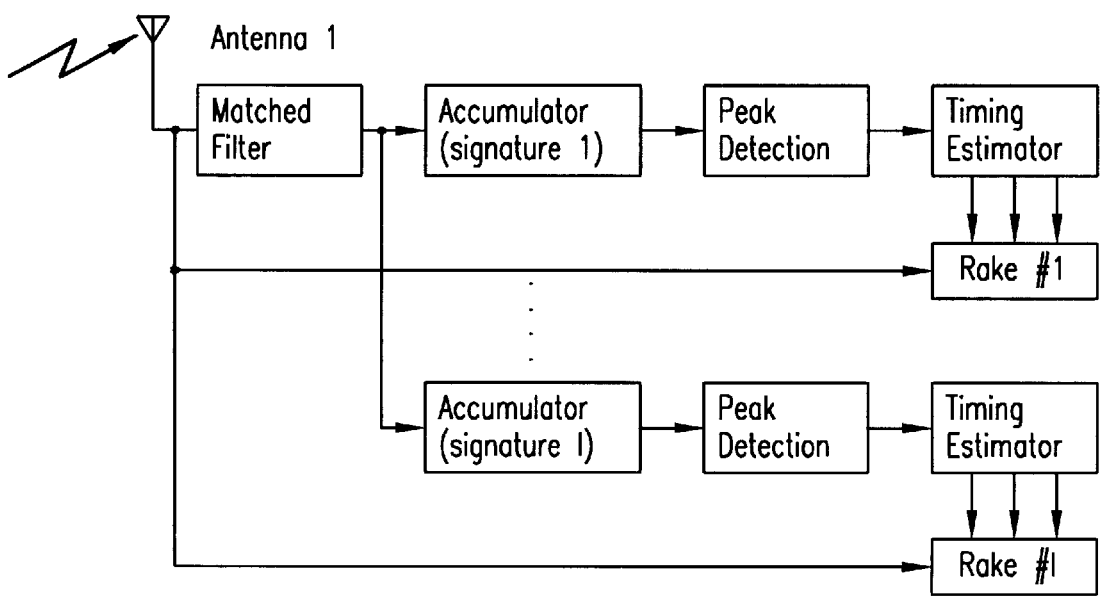
FIG. 3 is a block diagram of a detection section (for one antenna) of a base station's random access receiver, which functions primarily to estimate the timing of the received signal rays.
Figure 4:
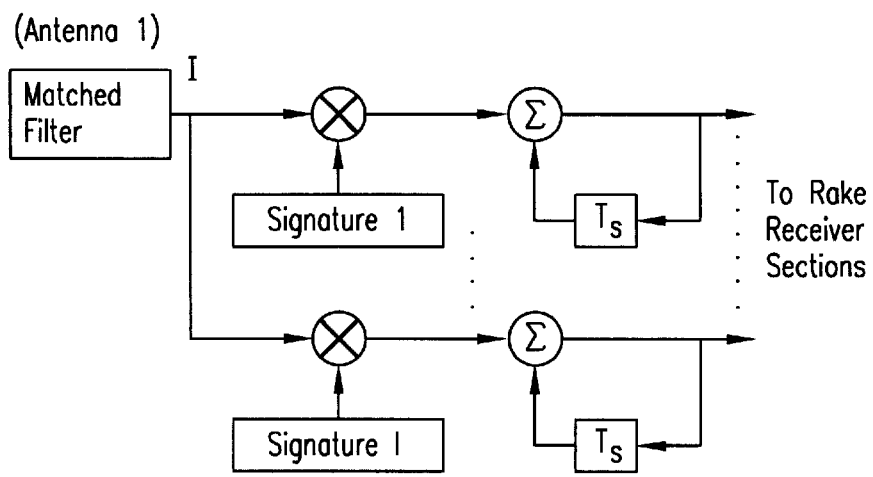
FIG. 4 is a simple block diagram of an accumulator that can be used for the I channel (quadrature detection) in the random access detector section shown in FIG. 3.
Figure 5:
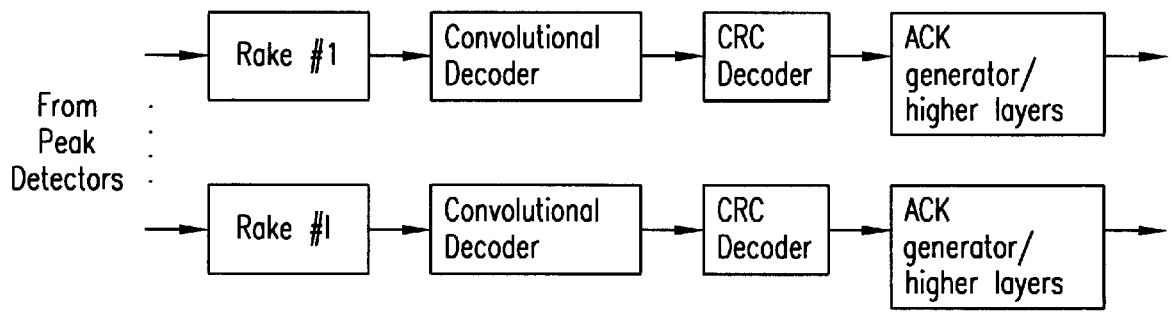
FIG. 5 is a block diagram of a random access demodulator that can be used to demodulate the data field portion of a random access packet.
Figure 6:
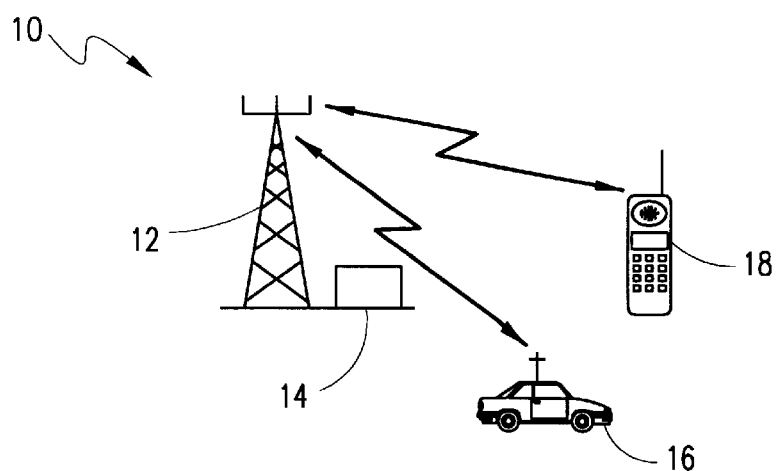
FIG. 6 is a block diagram of a pertinent section of a cellular communications system, which can be used to implement the method of the present invention.

Specifically, referring to FIG. 6, a pertinent section of a cellular communications system 10 is shown, which can be used to implement the method of the present invention. System 10 includes a base station transmit/receive antenna 12 and transmitter/receiver section 14, and a plurality of mobile stations 16 and 18. Although only two mobile stations are shown, FIG. 6 is for illustrative purposes only, and the present invention can be assumed to include more than two mobile stations. Prior to generating and transmitting an access request frame, a mobile station (e.g., 16) acquires synchronization, or synchronizes, with a target base station receiver (14). The mobile station then determines the starting time for each slot from the base station's broadcast/pilot channel information. The mobile station also retrieves the number of the slot being processed from the broadcast/pilot channel information, which is to be used by the base station to tag its acknowledgment (ACK) message reply with the slot number to ensure that the correct mobile receives the acknowledgment. More details for synchronizing a mobile station to a base station in a random access environment can be found in the '501 Application.

The target base station also transfers to the requesting mobile station(s) (e.g., over the downlink broadcast channel) each unique random access spreading code and long-code associated with each of the sectors and/or cells defined by the base station transceiver. For example, these unique spreading codes and long-codes can be Gold codes or Kasami codes. The mobile station stores the spreading code and long-code information in a memory storage area (not explicitly shown), which is to be retrieved and used by the mobile station to spread the preamble and data field of the random access request packets generated. Finally, the base station also transfers to the requesting mobile station(s) (e.g., in an appropriate broadcast message) the signature patterns associated with the preambles, which can be used to help distinguish between different sectors and/or cells.

For example, as described in the '501 application, in order to enable the base station receiver to more effectively distinguish between multiple random access requests, a preamble bit or symbol pattern is used. Each requesting mobile station can transmit one of L different preamble bit or symbol patterns ("signatures"). The different signature patterns used are, but not necessarily, orthogonal to each other. At the base station receiver, each of L accumulators is tuned to detect a specific signature coupled from the output of the receiver's matched filter. This signature preamble in a received signal is used by the base station receiver to effectively distinguish between simultaneous, different multiple access attempts made by the mobile stations.

Figure 7:
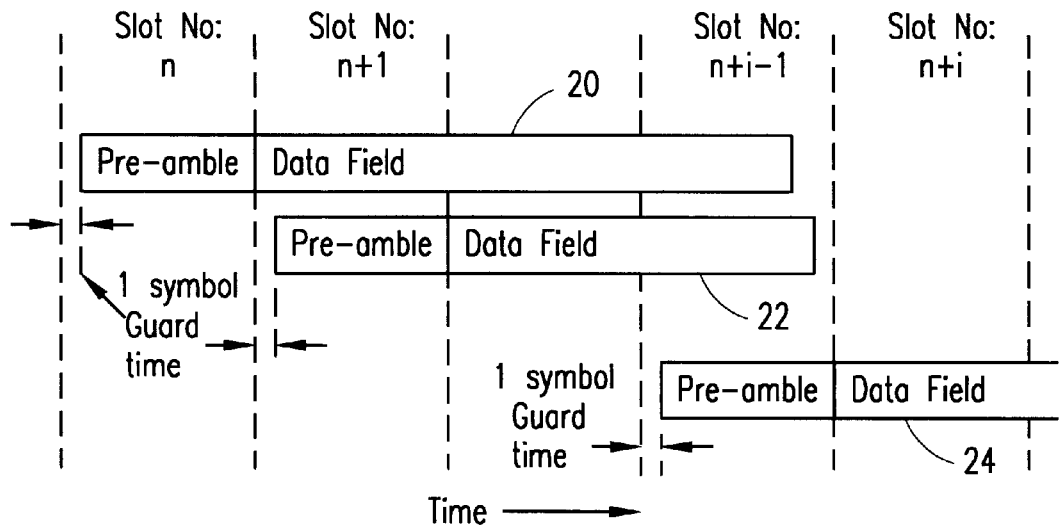
FIG. 7 is a diagram that illustrates the structure and timing of a plurality of random access request packets that can be transmitted by different mobile stations, in accordance with the preferred embodiment of the present invention.

FIG. 7 is a diagram that illustrates the structure and timing of a plurality of random access request packets that can be transmitted by different mobile stations, in accordance with the preferred embodiment of the present invention. Although only three random access request packets are shown for illustrative purposes, the invention is not intended to be so limited and can include the transmission and reception of more than three such packets. Essentially, for each of the random access request packets shown (20, 22 and 24), the S-ALOHA procedure used with the present method applies only to the preamble portion of the random access request process. The length of each preamble (20, 22 and 24) is set equal to the width of the time slots (n, n+1 . . . , n+i), minus (for design purposes) a predefined guard time to minimize potential interference between slots. For example, in practice, a one symbol guard time can be used. Also, as shown, the lengths of the data field portions of the random access request packets (20, 22 and 24) can be varied according to the desired application, which provides mobiles with flexibility in transmitting different length data fields.

In order to avoid collisions between any two random access attempts made by mobile stations in two different sectors of a cell, or between two random access attempts made by mobile stations in adjacent cells, the following spreading method can be used. As described earlier, the mobile stations making the random access requests, each generate unique preambles using a cell-sector specific spreading code (e.g., retrieved from a respective internal memory area). In practice, these codes can be reused for other cells which are separated by a sufficient distance.

Figure 8:
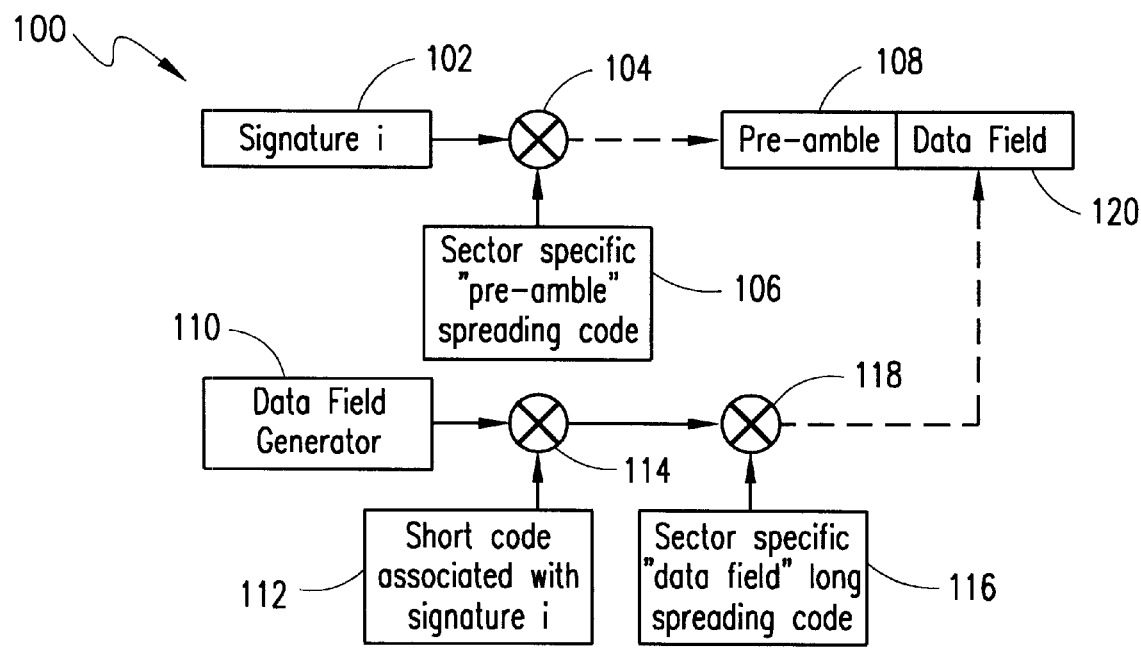
FIG. 8 is a simple block diagram of an apparatus that can be used to implement the method for use with a mobile station to generate and transmit a random access packet such as the random access packets shown in FIG. 7, in accordance with the preferred embodiment of the present invention.

FIG. 8 is a simple block diagram of an apparatus that can be used to implement the method for use with a mobile station to generate and transmit a random access packet such as the random access packets shown in FIG. 7, in accordance with the preferred embodiment of the present invention. In one embodiment, the present method can be implemented under the control of a microprocessor (not explicitly shown) located in the mobile station. The random access packet generating apparatus 100 includes a signal mixer 104, which spreads a "signature i" 102 (e.g., retrieved from an internal memory area in the mobile station 18) with a specific preamble spreading code for the cell-sector involved (e.g., also retrieved from the internal memory area) to form the cell-sector specific preamble of the random access packet to be transmitted. The data field of the random access packet to be transmitted is generated with a data field generator 110. A mixer 114 spreads the generated data field with a unique short spreading code (112) associated with the "signature i". The resulting data field of the random access packet is then spread with a concatenated code, which can be constructed, for example, by a modulo-2 addition (by mixer 118) of the signature-associated short code (112) with a sector-specific long spreading code 116 (e.g., retrieved from an internal memory area). The length of the resulting data field (120) of the random access packet to be transmitted can be flexibly selected at the mobile station (e.g., hours or days long). The length of the resulting data field (120) can be varied at the mobile station, which provides an effective and quick way to establish long data or voice calls.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A signal format for use in transmitting a random access request in a mobile communications system, comprising:

a preamble, said preamble including a signature code spread with a first spreading code, said first spreading code associated with a predetermined sector;

a data field, said data field including information data spread with a short spreading code, said short spreading code associated with said signature code, said information data spread with a short spreading code further spread with a long spreading code, said long spreading code associated with said predetermined sector; and wherein said first spreading code, said short spreading code, and said long spreading code differ from one another.

2. The signal format according to claim 1, wherein a length of said preamble is set substantially equal to a width of a transmission slot.

3. The signal format according to claim 1, wherein a length of said data field is selectively varied.

4. The signal format according to claim 1, wherein a length of said data field is equal to at least one hour.

5. The signal format according to claim 1, wherein said data field is spread by a concatenated code having at least one of a unique pattern and phase.

6. The signal format according to claim 1, wherein said signature code comprises one of a plurality of signature patterns.

7. The signal format according to claim 1, wherein said preamble and said data field comprise a random access packet.

8. A method for use in creating a random access packet in a mobile communications system, comprising the steps of:

generating a preamble by combining a signature code with a spreading code, said spreading code associated with a predetermined sector;

generating a data field;

spreading said data field with a short code associated with said signature code;

further spreading said spread data field with a long spreading code associated with said predetermined sector; and wherein said spreading code, said short code, and said long spreading code differ from one another.

9. The method according to claim 8, further comprising the step of transmitting said random access packet from a mobile station.

10. The method according to claim 8, wherein said step of generating a preamble further comprises setting a length of said preamble to coincide substantially with a duration of a transmission slot.

11. The method according to claim 8, wherein said further spreading step comprises the step of selecting a length of said data field.

12. The method according to claim 8, further comprising the step of utilizing a matched filter in a target base station receiver during a period of time subsequent to transmitting said preamble.

13. The method according to claim 8, wherein said further spreading step comprises the step of concatenating said spread data field with said long spreading code.

14. The method according to claim 13, wherein said concatenating step comprises modulo-2 addition.

15. An apparatus for use in creating a random access packet in a mobile communications system, comprising:

first generating means for generating a preamble;

first spreading means for spreading a signature code with a spreading code associated with a predetermined sector;

second generating means for generating a data field;

second spreading means for spreading said data field with a short code associated with said signature code;

third spreading means for spreading said spread data field with a long spreading code associated with said predetermined sector; and wherein said spreading code, said short code, and said long spreading code differ from one another.

16. The apparatus according to claim 15, further comprising a microprocessor located in a mobile station.

17. The apparatus according to claim 15, wherein a length of said preamble corresponds substantially with a duration of a transmission slot.

* * * * *